United States Patent

[11] 3,580,690

[72] Inventor Arthur A. McClure
 Orange, Conn.
[21] Appl. No. 831,601
[22] Filed June 9, 1969
[45] Patented May 25, 1971
[73] Assignee Michael Cerrito
 New Haven, Conn.

[54] INSERT CHASER DIE HEAD
 17 Claims, 10 Drawing Figs.
[52] U.S. Cl. .................................................. 408/178,
 10/96, 10/121
[51] Int. Cl. .................................................. B23g 1/00,
 B23g 5/12
[50] Field of Search .......................................... 10/89 (H),
 89 (P), 96, 101, 102, 115, 116, 120, 121, 122,
 123; 279/69, 71, 74

[56] References Cited
 UNITED STATES PATENTS
1,146,354 7/1915 Shaw ............................. 10/96
1,318,115 10/1919 Smith ............................ 10/96
2,197,336 4/1940 Breitenstein ................. 10/96
2,710,979 6/1955 Strickland .................... 10/96
3,276,051 10/1966 Strickland .................... 10/96

Primary Examiner—Richard J. Herbst
Assistant Examiner—E. M. Combs
Attorney—Delio and Montgomery ABSTRACT: An insert chaser die head having a main frame member to which is attached a control plate having at least one guiding groove on its front face and rotating plate means positioned adjacent said control plate. The rotating plate means has at least one bore therein for supporting an actuating pin member whose end travels in the guiding groove and is biased by a spring located in the groove. At least two more bores are formed in the rotating plate for supporting at least two driven pin members, so that a portion of the ends of the pin members protrude from the rotating plate means. A stationary body member mounted adjacent the rotating plate means has at least two channels for slidably supporting at least two carrier members which, in turn, support individual chasers for cutting threads on workpieces. Individual guideways communicating with each channel are formed in the body member to permit the ends of the driven pin members to pass therethrough and engage cam grooves in the carrier members such that, upon rotation of the rotating plate means, the carrier members are moved toward or away from each other.

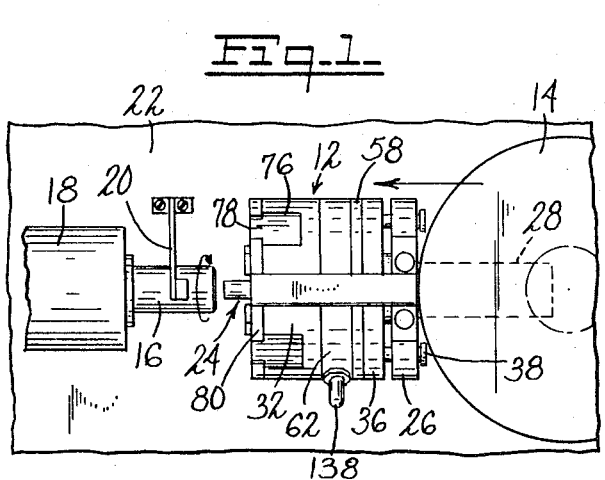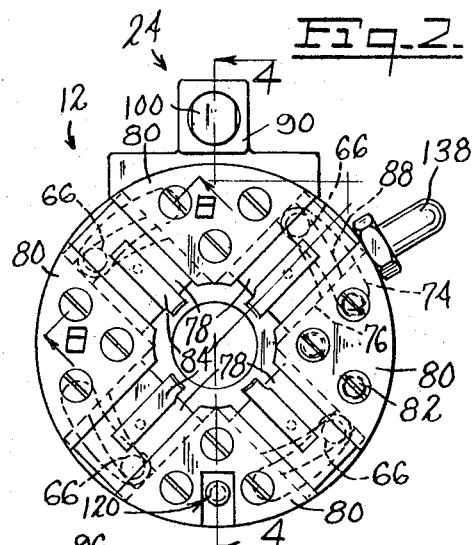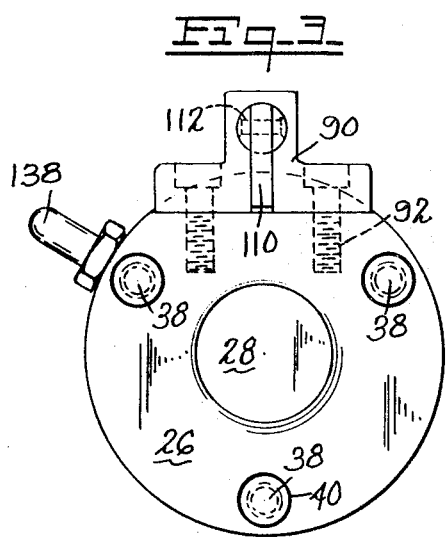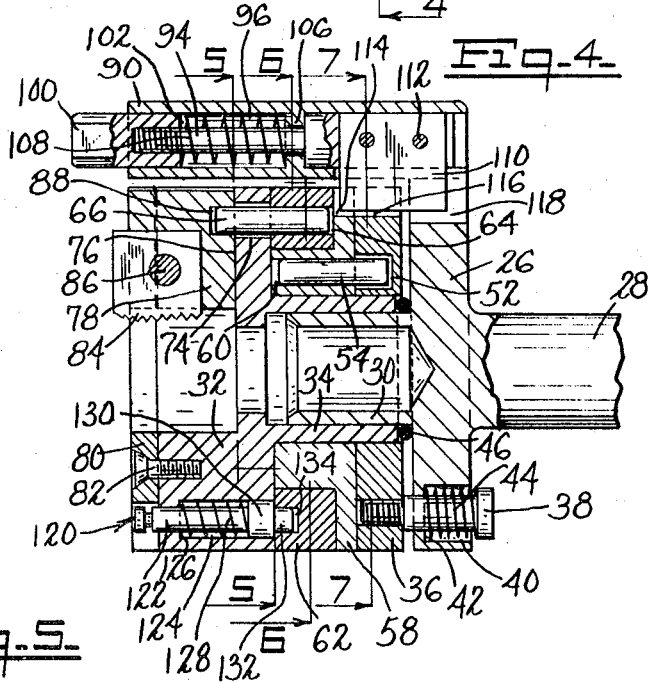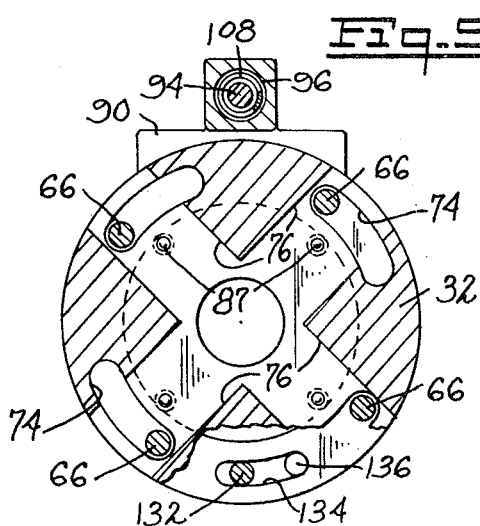

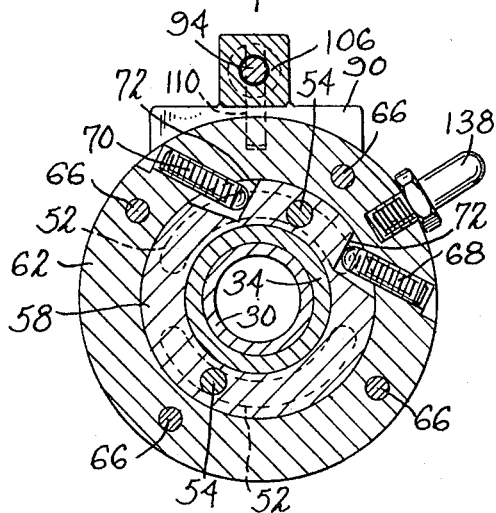
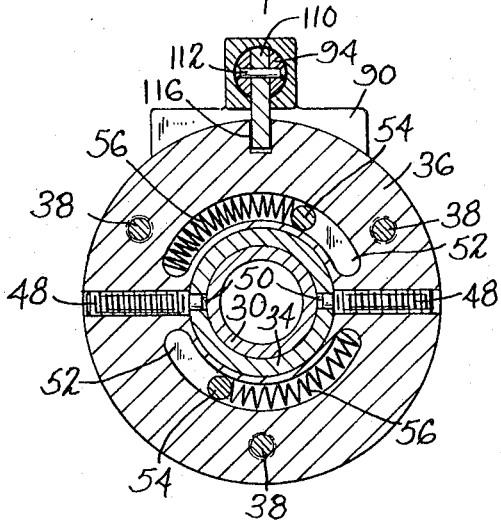
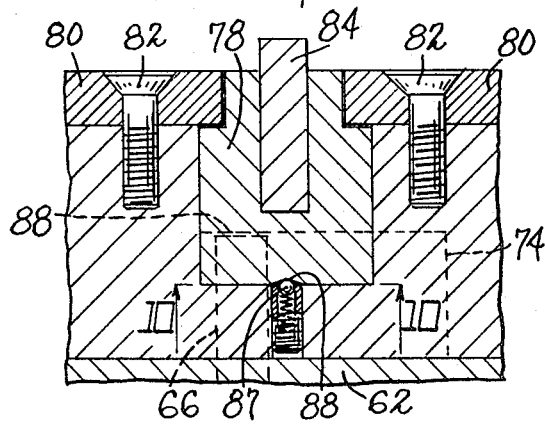
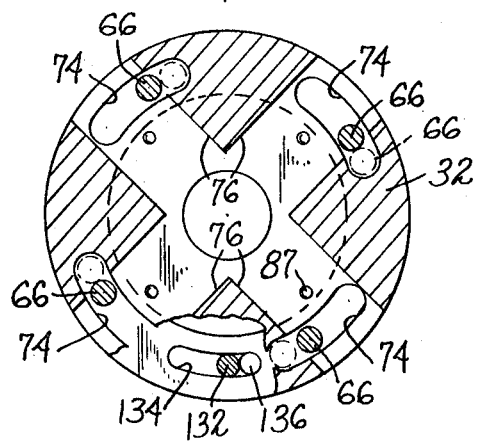
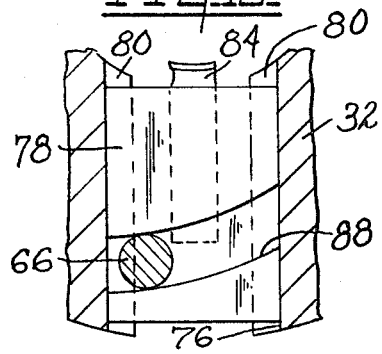

3,580,690

INSERT CHASER DIE HEAD

This invention relates to an insert chaser die head and more particularly to an insert rotary and nonrotary chaser die head.

Presently available insert chaser die heads for cutting threads on workpieces are complicated and expensive. They are preferred, however, to thread rolling machines since they produce better threads and their total cost is less than thread rolling machines. An insert chaser die head can be used with an ordinary lathe whereas, to use thread-rolling dies, it is necessary to purchase an entire thread-rolling machine. Another advantage of an insert chaser die head, is that it can cut threads on workpieces of many different metals, while thread rolling can be carried out only with metals having high tensile strength.

Insert chaser die heads, whether rotary or nonrotary, function in a similar manner. With a nonrotary die head, the workpiece is rotated and the die head is moved onto the workpiece. With a rotary die head, the nonrotating workpiece is moved toward the rotating die head. A rotary die head is used to form threads when the shape of a workpiece is such that it is impractical to rotate it. Both a rotary and a nonrotary die head usually has a plurality of thread-cutting members (chasers) positioned with their cutting edges in a fixed relationship to each other so that the cutting edges can cut threads of a given size on a workpiece. When a thread of sufficient length has been cut, the chasers must be capable of movement away from the threads to thereby permit the die head to withdraw without stripping the threads. All such die heads have some type of movement means for this purpose, as well as releasing means for allowing the movement means to operate after a sufficient length of thread has been cut. Such movement means and releasing means must be easily operable so the chasers can be reset for the cutting of new threads. The chasers must also be easily removable from the die head for replacement of worn chasers.

Insert chaser die heads presently on the market have very complex and expensive movement and releasing mechanisms. In some cases, as a result of the particular movement means used, the chasers are formed integrally with a carrier member, such that the entire piece has to be discarded when the cutting edges are worn. In other cases, the locking pin (whose movement permits the chaser and its carrier to be removed) is positioned at almost inaccessible positions on the die head. In these cases, the die head has to be removed from the machine before the chasers and carriers can be removed. With all of these die heads, complicated releasing means composed of many parts, are used to actuate the movement mechanism which permits the chasers to move away from each other. It is obvious that, with such mechanisms, the cost of maintaining the mechanism in operation increases with the number of moving parts.

In the most advanced die heads, the carriers for the chasers have cam surfaces which are engaged by cammed elevations on a plate member so that upon rotation of the plate member, the carriers are moved toward or away from each other. This type of plate member with cammed elevations, is an intricately machined part which is expensive to produce. When the cammed elevations have worn to the point that the movement means does not operate properly, the entire part has to be discarded. As a result, the maintenance of this type of die head is quite expensive.

It may be stated summarily that all the insert chaser die heads presently available have a great many parts which easily wear out and need constant replacement. Further, the movement and releasing mechanisms of these die heads are such that, when one operating surface is worn out, a large part of the die head has to be replaced, thus the maintenance is very expensive. Moreover, since all of the main parts in the prior art insert die heads are subject to considerable stress, these parts must be machined from expensive stainless steel.

Another disadvantage of the prior art die heads is that most if not all of the die head constructions are suitable for either rotary operation or nonrotary operation, but not for both types of operation.

In view of the foregoing, an object of this invention is to provide a new and improved insert chaser diehead for use in either rotary or nonrotary operation.

Another object of the invention is to provide a new and improved insert chaser die head which is less expensive than prior art die heads. A further object of the invention is to provide a new and improved insert chaser die head in which the parts prone to wear are inexpensive and simple to replace.

Still another object of the invention is to provide a new and improved insert chaser die head having a simple mechanism for positioning the chasers and their carriers in the die head and for moving the carriers toward and away from each other.

A still further object of the invention is to provide a new and improved insert chaser die head in which a simple inexpensive mechanism is used to release the mechanism which moves the carriers toward and away from each other.

Yet another object of the invention is to provide a new and improved insert chaser die head having a simple mechanism for permitting the chasers and their carriers to be removed from the die head.

Still other objects and advantages of the invention will in part be obvious and will in part appear from the specification.

In accordance with the invention, the insert chaser die head comprises a frame member to which is attached control plate means having at least one guiding groove thereon and rotary plate means positioned adjacent said control plate means. The rotary plate means has a plurality of bores for supporting at least one actuating pin member having an end that protrudes from the rear face of the rotary plate means and travels in the guiding groove. At least two driven pin members are supported in bores in the rotating plate means so that the ends of the pins protrude from the front face of the rotating plate means. A stationary body member having at least two channels and at least two guideways in communication with the channels, is positioned adjacent the rotating plate means so that the driven pin members travel in the guideways and channels. At least two carrier members, each supporting a chaser and having cam grooves, are slidably mounted in the channels such that the driven pin members engage the cam grooves to position the carriers and move them toward or away from each other. Resilient biasing means in the guiding grooves act on said actuating pin member to cause the rotating plate means to rotate. Releasing means mounted on the frame member maintain the rotating plate means in a certain fixed position for cutting the threads on a workpiece and to release the rotating plate means so the chasers and their carriers may move away from the formed threads. Locking means engage a travel groove in the front face of the rotating plate means to limit the rotation of the rotating plate means. When the locking means is opened, the rotating plate means rotates in order that the driven pin member may pass out of the cam grooves in the carriers to permit the removal of the carriers and chasers from the channels in the stationary body member.

The invention accordingly comprises the features of construction, combination of elements and arrangement of parts which will be exemplified in the construction hereinafter set forth and the scope of the invention will be indicated in the claims. For a fuller understanding of the nature and objects of the invention, reference is had to the following description taken in connection with the accompanying drawings, in which FIG. 1 is a top view of the preferred embodiment of the insert chaser die head about to cut threads on a rotating workpiece;

FIG. 2 is a front view of the insert chaser die head;

FIG. 3 is a rear view of the insert chaser die head;

FIG. 4 is a sectional view taken along line 4—4 of FIG. 2;

FIG. 5 is a sectional view taken along line 5—5 of FIG. 4, showing the driven pin members in position during the cutting of threads on a workpiece;

FIG. 6 is a sectional view taken along line 6—6 of FIG. 4;

FIG. 7 is a sectional view taken along line 7—7 of FIG. 4;

FIG. 8 is a sectional view taken along line 8—8 of FIG. 2;

FIG. 9 is a sectional view taken along line 5—5 of FIG. 4, showing the driven pin members in a released position; and FIG. 10 is a sectional view taken along line 10—10 of FIG. 8.

As shown in FIG. 1, the insert chaser die head 12 is mounted on a turret 14 of a lathe which moves the die head toward a rotating workpiece 16 mounted on rotating spindle 18. A finger 20 is attached to the frame 22 of the lathe for tripping releasing mechanism 24 on the die head, as will be more fully explained below. The die head illustrated in these figures is nonrotary. However, as will also be explained below, the same die head with a few minor alterations can be used as a rotary die head.

As illustrated in FIGS. 2—10, the die head comprises a main frame member 26 having a shank 28 formed integrally therewith for positioning frame member 26 on the turret 14, as viewed in FIG. 1. On the other side of the frame 26 a sleeve section 30 is formed integrally therewith for supporting the other parts of the die head. Stationary body member 32 is mounted and positioned relative to the frame member 26 by means of a sleeve section 34 which passes over the sleeve section 30. A spring control plate 36 is mounted on the sleeve section 34 and affixed to the frame member 26 by means of threaded bolts 38 which engage plate 36 to hold the plate in fixed relationship to frame member 26. The bolts 38 pass through enlarged openings 40 having shoulders 42 thereon. Springs 44 are positioned on threaded bolts 38 to abut shoulders 42 and bias the control plate 36 toward frame member 26, such that both members are capable of limited movement along the longitudinal axis of shank 28. The purpose of this limited movement will be described hereinafter.

A resilient O-ring 46 or other resilient means, is located about sleeve section 30 to cushion the force of the movement of control plate 36 toward frame member 26 by means of springs 44. As shown in FIG. 7, the plate member 36 is affixed to sleeve section 34 by threaded members 48 passing through the member 36 to engage openings 50 on the sleeve section 34. In this manner the frame member 26, stationary body member 32 and control plate 36 are positioned in stationary relationship to each other, whereby only limited movement between control plate 36 and frame member 26 is permitted. Annular guiding grooves 52 are formed in the forward face of the control plate 36 to guide and cause the travel of actuating pin members 54 which engage the grooves. Biasing springs 56 in the grooves 52 act on the pin members 54 to cause them to move in the grooves. A first rotating plug member 58 is mounted for rotation on the sleeve section 34 adjacent the control plate 36. Actuating pin members 54 are supported in bores 60 formed in the plug member 58. The size of the bores 60 is preferably such that the pins 54 can be press-fitted therein.

A rotating sleeve member 62 is fixed to plug member 58 for integral rotation therewith. Four bores 64 are formed at predetermined intervals in sleeve member 62 for supporting driven pins 66. The sleeve member 62 is positioned on the plug member 58 such that, when the die head is in operation, the two members are in fixed spacial relationship. This is accomplished by threaded members 68 and 70 passing through sleeve member 62 to engage cutaway surfaces 72, as seen in FIG. 6. By adjustment of the threaded members 68 and 70, the positions of the driven pin member 66 may be adjusted relative to actuating pin member 54, for purposes which will be later explained. Again, the bores 64 are formed such that pin member 66 can be press-fitted therein. The driven pin members 66 pass through partially circumferential guideways 74, as viewed in FIG. 5, to guide and limit the rotation of sleeve member 62.

Four channels 76 are formed on the upper surface of body member 32 and intersect to form a central hollow area. Carrier members 78 slidably supported in channels 76 are partially retained in position by top plates 80 attached to the top face of body member 32 with threaded members 82, as seen in FIG. 8. Each carrier has a chaser 84 attached thereto by mounting pins 86 for cutting of threads on a workpiece. Each carrier member is further retained in position by means of the forward ends of the driven pin members 66 engaging cam grooves 88 on the lower side of carrier members 78. When the driven pin members 66 are in the position shown by dotted lines in FIG. 9, the carrier members 78 can easily slide into the channels 76 on the body member 32. A spring-biased ball detent 87 snaps into place in a cavity 89 formed at the bottom of carrier members 78 when the carrier members are properly positioned, such that the pin members 66 can pass into the guiding grooves 88.

To more fully understand the operation of the die head, the releasing mechanism 24 must be considered. The mechanism 24 is housed in housing member 90 mounted on frame member 26 by threaded members 92. A release rod 94 is slidably mounted in bore 96 of housing member 90 and a contact knob 100 is threadedly connected to the forward end of the rod 94 to form a shoulder 102. At the other end of the rod 94 to form a plunger section is formed integrally therewith so as to slide in the bore 104. An annular shoulder area 106 is located between bores 96 and 104, such that biasing spring 108 which rests on shoulders 102 and 106, forces the plunger section 98 against shoulder 106. A flag member 110 is mounted in a slot in plunger section 98 by pins 112. The flag 110 slides in slots 114, 116 and 118 formed in frame member 26, control plate member 36 and rotating plug 58, respectively. The slot 114 in rotating plug 58 is formed such that the driven pin members 66 will be in the position shown in FIG. 5 when the flag 110 engages the slot to hold the rotating plug 58 stationary. This is the position in which carrier members 78 are locked for cutting threads on workpiece 16. As the die head advances, the knob 100 will hit the finger 20 and be forced back along with the rod 94, the plunger section 98 and flag member 110. When the flag member 110 passes out of slot 118, rotating plate member 58 and sleeve member 62 will rotate together as a result of springs 56 acting upon actuating pin members 54. The rotating plug member 58 and sleeve member 62 will rotate until the driven pin members 66 are in the position shown in FIG. 9. The travel of the driven pin members 66 in guideways 74, in conjunction with the movement of the pins in cam grooves 88, will cause the carrier members 78 to slide away from each other a limited distance. This will permit the cutting edges of the chasers 84 to move from the workpiece so that the die head may be removed from the workpiece without stripping the threads. This sliding action can be better understood by viewing, in FIG. 2, the path of the guideways 74 and cam grooves 88 with respect to each other.

The rotation of sleeve member 62 is limited to the position shown in FIG. 9 as a result of locking means 120. The locking means 120 consists of a pin member 122 slidably mounted in an enlarged bore 124 in body member 32. A spring 128 rests on the shoulder 126 to bias pin member 122 against the sleeve member 62, such that an enlarged section 130 of the pin member 122 abuts sleeve member 62. An end 132 of the pin 122 passes into and engages circular travel groove 134 formed in sleeve member 62. When carrier members 78 are in their cutting position, the driven pins 66 and locking pin 122 are in the position shown in FIG. 5. When the rotating plug 58 and sleeve 62 are permitted to rotate, rotation is stopped when the locking pin 122 abuts stop pin 136, so that driven pins 66 are arrested in the position shown in FIG. 9. This amount of rotation sufficiently moves the cutting edges of chasers 89 away from the workpiece to permit its removal from the workpiece. The pins 66 remain in the cam grooves, however, to prevent carrier members 78 from sliding out of the channels 76. If it is desired to remove the carrier members 78 from the die head to replace a broken or worn chaser, the locking pin 120 is raised so that the end 132 of the pin passes out of the travel groove 134. This permits further rotation of driven pins 66 to the position shown by the dotted line in FIG. 9. At this point, the carrier members 78 may be easily removed from the die head.

The carrier members 78 are brought to their cutting position simply by rotating sleeve member 62 and the plug 58 so that the flag 110 can pass into the slot 114 to lock the members for a new thread-cutting operation. This is accomplished by means of a handle 138 connected to sleeve member 62. The handle 138 can be moved manually to reset the die head. Alternatively, the turret 14 can be moved so that the handle 138 abuts a stationary member (not shown) on the lathe to move the handle and reset the die head, as is well known in the prior art.

The die head of this invention does not require a finger 20 for operating release mechanism 24. A finger such as that shown is used to form high-quality threads, since the chasers are withdrawn from the workpiece very quickly there is little chance of the threads being stripped. However, if a finger 20 is not used, the release mechanism can be operated simply by stopping the forward movement of the turret. Since the chasers will tend to continue cutting a thread all of the die head, with the exception of frame member 26, will continue to move forward so that the flag member 110 will pass out of slot 114 to permit driven pin members 66 to rotate and move the chasers 84 away from the workpiece. As soon as the chasers 84 are free of the workpiece, the forward section of the die head will spring back to its original position against the frame member 26 under the influence of biasing springs 44. Thus, the die head of this invention can be released from the workpiece either by a finger member impinging on releasing mechanism 24 or by stopping the forward motion of the die head.

As stated previously, the die head of the preferred embodiment is illustrated as being nonrotary. However, by a few simple adjustments to the releasing mechanism, the die head of this invention may also be used as a rotary die head for use in cutting threads on a nonrotating workpiece.

One type of releasing mechanism which may be used with the die head of this invention when it is being rotated, consists of a sleeve having a flange thereon. The sleeve is attached to the frame member 26 for rotation with the die head while being capable of limited movement along the longitudinal axis of the die head with respect to the frame member 26. A pin connected to the sleeve is spring biased so that it is forced into an opening in plug member 58 to lock that member in a cutting position. This type of releasing mechanism can be actuated by a finger striking the flange on the sleeve to force the pin out of the opening in plug member 58. Also, this type of releasing mechanism can be actuated by simply stopping the forward motion of the workpiece, whereupon the forward portion of the die head will move forward and the pin will pass out of the opening in plug member 58, as explained in connection with the embodiment disclosed in the drawings. A pivoting yoke may also be mounted on the flange of the sleeve member to trip the releasing mechanism, in a manner known in the art.

By comparison with the prior art, it will be noted that the die head of this invention is constructed of a relatively small number of simple parts. In particular, actuating pin member 54 and driven pin members 66 are merely press-fitted into their respective bores in plate member 58 and sleeve member 62. These pins, as well as locking pin 122, are fitted so that their tops or bottoms do not ride or slide on any member. This prevents unnecessary friction and permits consistent operation of these parts without jamming.

In accordance with this invention, the rotating plug member 58 and sleeve member 62 may be formed as one integral part. The advantage of having two parts, however, as shown in the preferred embodiment, is that the position of driven pins 66 may be adjusted relative to the position of actuating pin 54 by means of threaded members 68 and 70. This is desirable in order to have a final adjustment for fixing the diameter defined by the cutting edges of the chasers, for cutting threads. Accordingly, by loosening threaded member 68 and tightening threaded member 70, the driven pins 66 can be moved to vary the initial position of the carriers and the chasers mounted thereon.

Another advantage of the present invention is that because of the specific construction of the die head, all of the parts do not have to be constructed from stainless steel. The body member 32, frame member 26, as well as frame member 90, may be constructed from a less expensive metal, such as aluminum, since these parts are not subjected to high stresses.

The die head of this invention has all of the versatility of the more complex die heads of the prior art. The releasing mechanism 24 may be easily actuated by a finger or simply by stopping the forward movement of the die head. This mechanism has an extremely simple construction, consisting of only a single moving part, in comparison with the releasing mechanisms of the prior art. As a result, the mechanism operates consistently and does not require expensive maintenance. Further, by the substitution of another simple releasing mechanism, which operates on the same principle as mechanism 24, the die head may be used as a rotary die head.

Additionally, simple locking means 120 releases carriers 78 from the die head. This means is located in the forward section of the die head where it is easily accessible. Further, the use of an abutment pin 136 in travel groove 134 prevents wear on the rotating sleeve 62. With the use of pin 136 and replaceable pins 66 and 54, the rotating plug member and rotating sleeve member last for very long periods of time. In the die heads of the prior art, expensively machined rotating plate members had to be replaced frequently. It can be appreciated, therefore, that not only is the initial cost of construction of the die head of this invention considerably less than that of the prior art but, also, the cost of maintenance is substantially less than that of the prior art die heads.

It will thus be seen that the objects set forth above, among those made apparent from the preceding description, are efficiently attained and since certain changes may be made in the above article without departing from the spirit and scope of the invention, it is intended that all matter contained in the foregoing description and shown in the accompanying drawings shall be interpreted as illustrative and not in a limiting sense.

What I claim is:

1. An insert chaser die head for cutting threads on a workpiece, comprising
   a. a frame member,
   b. control plate means positioned on said frame member and having at least one guiding groove thereon,
   c. rotating plate means positioned adjacent said control plate means and having a plurality of bores therein,
   d. at least one actuating pin member mounted in one of said bores so that the end of the pin may engage and travel in said guiding groove,
   e. at least two driven pin members mounted in said bores so that a protruding portion of each of said pins extends from the rotating plate means in a direction away from said control plate means,
   f. a stationary body member positioned adjacent said rotary plate means, having at least two channels therein and at least two guideways communicating with said channels, such that said driven pin members travel in said guideways and communicate with said channels, and
   g. at least two cutting members each having a cam groove, such that said protruding portions of said driven pin members travel in said grooves to move said members in said channels toward and away from each other.

2. A die head in accordance with claim 1, including resilient means located in said guiding groove for biasing said actuating pin member to cause said rotating plate means to rotate.

3. A die head in accordance with claim 2, further including releasing means which engage said rotating plate means to prevent rotation of said plate means against the force of said resilient means.

4. A die head in accordance with claim 1, wherein said stationary body member has four channels which intersect to form a central hollow area and the axes of each pair of channels intersect at an angle of substantially 90°, wherein said cutting members comprise four carrier members which are slidably mounted in said channels, each carrier member having a chaser mounted thereon, and wherein four plate members are positioned on said stationary body member adjacent said channels to retain said carrier members in said channels.

5. A die head in accordance with claim 3, wherein said releasing means comprises a housing member mounted on said frame member, a spring biased rod slidably mounted in said housing member, the front end of said rod extending beyond said cutting members along the longitudinal axis of said stationary body member, and a flag member attached to the rear end of said rod and passing into a slot in said rotary plate means to prevent rotation of said rotating plate means when the front end of said rod is not acted upon.

6. A die head in accordance with claim 1, wherein said control plate means is attached to said frame member by a plurality of resiliently biased threaded members, such that said control plate means is capable of limited movement with respect to said frame member along the longitudinal axis of the die head.

7. A die head in accordance with claim 4, wherein said frame member has a first sleeve section and said stationary body member has a second sleeve section, and wherein said first sleeve section passes into said second sleeve section to form a tubular support section which passes through and supports said control plate means and said rotating plate means.

8. A die head in accordance with claim 7, wherein said control plate means is fixed to said second sleeve section by threaded members passing through said stationary body member to engage said second sleeve section, whereby said second sleeve section is incapable of movement with respect to said control plate means.

9. A die head in accordance with claim 1, further including locking means mounted in said stationary body member for limiting the rotation of said rotating plate means to prevent said driven pin members from disengaging said cam grooves in said cutting members.

10. A die head in accordance with claim 9, wherein said locking means comprises a spring biased locking pin mounted in said stationary body member, wherein said rotating plate means has a travel groove of limited length adjacent said stationary body member, such that one end of the locking pin can engage said travel groove for limiting the rotation of the rotary plate means to the length of said travel groove, and such that said locking pin can be moved out of said travel groove to allow further rotation of said rotating plate means so that said driven pin members can completely pass out of the cam grooves in said cutting members.

11. A die head in accordance with claim 1, wherein said rotating plate means comprises a rear plug member adjacent said control plate means, said rear plug member having at least one bore therein for supporting at least one actuating pin member which travels through a guiding groove in said control plate means, and a front sleeve member positioned on said rear plug member having at least two bores therein for supporting two driven pin members, which driven pin members engage the cam grooves in said cutting members.

12. A die head in accordance with claim 11, wherein said front sleeve member is fixed to said rear plug member for movement as an integral member by means of two threaded members passing through said sleeve member to engage cutaway surfaces on said plug member.

13. A die head in accordance with claim 10, further including abutment means in said travel groove against which the locking pin abuts to prevent wear on the travel groove.

14. A die head in accordance with claim 5, further including a handle connected to and for rotating said rotating plate means to permit the flag member of the releasing means to engage the slot in said rotating plate means.

15. A die head in accordance with claim 4, wherein said rotating plate means has four bores therein for positioning and supporting four driven pin members, and wherein said stationary body member has four guideways therein each adjacent to and communicating with a separate channel, such that each of said driven pin members travels through a separate guideway to engage the cam groove of a carrier member.

16. A die head in accordance with claim 15, wherein said rotating plate means has two bores therein for supporting two actuating pin members, and wherein said control plate means has two guiding grooves therein, each of said guiding grooves containing a biasing spring, such that the actuating pin member travels in a separate guideway groove and is biased by said springs.

17. A die head in accordance with claim 15, further including ball detent means in said stationary body member adjacent each channel for cooperating with a depression in said carrier members to indicate when said carrier members are positioned in said channels, such that said driven pin members can pass into said cam grooves.